R. G. BULLOCK.
SHOW CASE.
APPLICATION FILED JAN. 7, 1911.

1,076,547.

Patented Oct. 21, 1913.

UNITED STATES PATENT OFFICE.

RAYMOND G. BULLOCK, OF JAMESTOWN, NEW YORK, ASSIGNOR TO ART METAL CONSTRUCTION COMPANY, OF JAMESTOWN, NEW YORK, A CORPORATION OF NEW YORK.

SHOW-CASE.

1,076,547.

Specification of Letters Patent. Patented Oct. 21, 1913.

Application filed January 7, 1911. Serial No. 601,479.

*To all whom it may concern:*

Be it known that I, RAYMOND G. BULLOCK, a citizen of the United States, residing at Jamestown, in the county of Chautauqua and State of New York, have invented certain new and useful Improvements in Show-Cases, of which the following is a specification.

The object of my invention is to provide a show case having glass sides, a glass top, metallic base and a skeleton metallic framework.

A further object of my invention is to make a separate metallic frame for each of the glass sides and the glass top, which frames can be readily connected to or separated from each other in setting the case up or taking it down.

Another object of my invention is to conceal the joints between the consecutive frames with suitable cornices or moldings.

Another object of my invention is to secure the glass firmly within its frame by means of metallic springs and felt padding.

Another object of my invention is to provide the show case with a suitable base in which the glass panels are held by gravity.

Another object of my invention is to provide suitable uprights in said show case with suitable adjustable supports thereon for shelves.

Another object of my invention is to provide the show case with suitable doors.

Another object of my invention is to form the case with certain details of construction and peculiar combinations of parts, all of which will be hereinafter fully explained and specifically pointed out in the claims.

In the accompanying drawings.

In the several figures of the drawings like reference numerals refer to like parts.

The several parts of my invention are substantially as follows: First, the base on which the case rests; second, the retaining molding which encircles the top of said base and which forms a suitable receptacle for the walls of the glass upright panels thereof; third, the glass panels which form the sides of the case, each of which panels consists of a steel molding surrounding and inclosing a plate of glass; fourth, a glass top similar in substantially all respects to the glass panels that constitute the sides; fifth, means for readily connecting and disconnecting these various panels; sixth, moldings and cornices for concealing the joints between consecutive panels and between side panels and the top panel. In addition to the foregoing I may also provide my case with suitable glass doors with a locking device therefor, the steel frames of the glass doors being of a special construction. I also provide material for making the joints between consecutive panels proof against dust. I also provide means for adjustably separating one or more shelves within the glass case and when the size of the case necessitates it I use two or more panels on each side of the case, with a suitable connection between such panels.

I will now describe the various parts of my invention in substantially the same order as set forth above.

Figure 1:
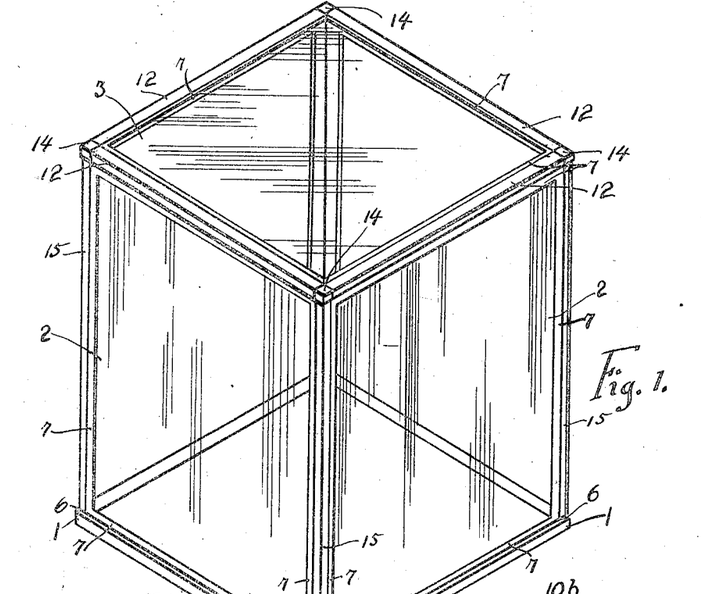
Figure 1 is a perspective view of the finished case having four glass sides and a glass top and a base, the glass of each of said sides being inclosed in a separate framework.

*The base.*—In Fig. 1 I have shown the base of my show case, in which figure reference numeral 1 indicates the base or base section. The base section 1 consists of a single sheet of metal having its corners cut away to a suitable pattern and its sides bent down and under, forming the shell illustrated in cross section in Fig. 7. As will be seen from Fig. 7, the base has a top plate 4 on which the various parts of the glass show case rest.

*The retaining molding.*—On the top plate 4 of the base 1 I have placed the retaining molding or channel 6. Each side of this molding consists of a single piece of sheet metal bent to the form shown in cross section in Fig. 7, the part being indicated by the reference numeral 6. The molding consists of a horizontal metal wall from which is bent up a vertical inner wall and a vertical outer wall, which outer wall is curved in at the top. The ends of the molding are beveled or mitered so as to form a miter joint between consecutive pieces of the molding. The several parts of the molding are welded or otherwise fastened together in any suitable manner, so as to form one continuous molding which encircles the outer edge of the top plate 4 of the base. This molding is fastened to the base by screws, rivets or any other suitable device. This molding is also recessed at appropriate intervals to receive the clips 5 on the steel frames of the glass panels, which clips will presently be described.

Figure 2:
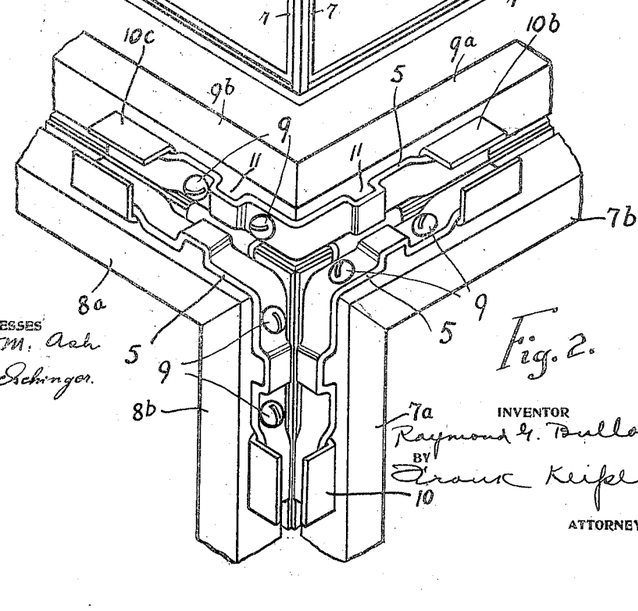
Fig. 2 is an enlarged view in perspective of one of the upper corners of the case, with the cornice and corner molding removed, showing the connections between the metal framework of the various panels.

*The glass panels.*—Each of the glass panels consist of a single pane of glass together with the steel frame which surrounds it and the other features incident thereto. The steel frame is made preferably of four pieces, each of which consists of a single sheet of metal bent to the form illustrated by the part 7, in Figs. 6 and 7, the part 7 being a steel molding bent to the shape substantially of a reverse curve. The molding 7 consists substantially of a base, on one side of which the metal is bent at a U shape extending perpendicularly therefrom, and on the other side the metal is bent up perpendicular to said base and curved in at the top. The wide recess above the base of the molding is to receive the glass panel 2, the spring angle packing 40 and the felt packing 41. The U shaped recess which opens in the opposite direction is intended to receive the felt packing, the purpose of which is to make dust proof the joints between the frames of consecutive panels. A separate piece of molding is provided for each of the rectangular sides of the plate of glass. Each of these moldings carries at its right hand end when viewed from the front, the clip 5, the clip being spot welded to the molding at that end. Three of these clips are illustrated in Fig. 2. Each of these clips is a single piece of sheet metal bent to the form of an angle and having each of its ends offset, and between the offset end and the angle of the clip a recess 11 is formed in said clip, which recess plays a necessary part in fastening the cornice molding to the finished case at the top, all of which will presently be described.

The upturned end of the clip is perforated for screw holes, and each of the moldings of the panel at its end opposite to where the clip is welded thereto is provided with suitable threaded openings to receive the screws that may be passed through the clip and into the panel. In this way the molding 7ª is connected to the molding 7ᵇ, as shown in Fig. 2, by placing the two moldings together at the corner as illustrated and passing the screws 9 down through the openings in the molding 7ᵇ. In like manner the other moldings that constitute the steel frame of the glass panel are connected together at each of the corners.

Figures 3, 4, 5, 6, 7, 8, 9, 10, 11, 12:
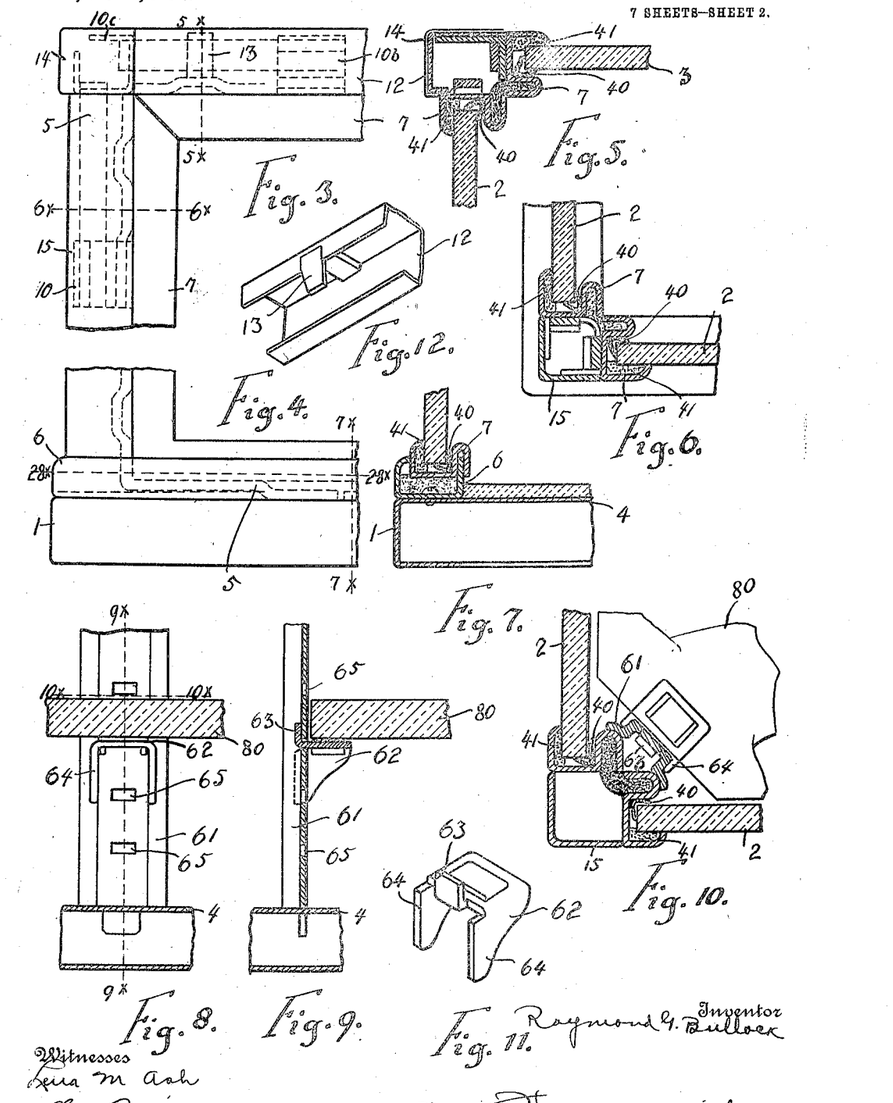
Fig. 3 is a side elevation of the upper left hand corner of one of the sides of the case, showing one of the metal frames for inclosing the glass panel.
Fig. 4 is a side elevation of the lower left hand corner of one of the sides of the case, showing one of the metal frames for inclosing the glass panel.
Fig. 5 is a vertical section on the line $5^x$—$5^x$ of Fig. 3.
Fig. 6 is a horizontal section on the line $6^x$—$6^x$ of Fig. 3.
Fig. 7 is a vertical section on the line $7^x$—$7^x$ of Fig. 4.
Fig. 8 is a front elevation of the upright or standard carried in the corner of the casing for supporting the shelf brackets.
Fig. 9 is a vertical section on the line $9^x$—$9^x$ of Fig. 8.
Fig. 10 is a horizontal section on the line $10^x$—$10^x$ of Fig. 8.
Fig. 11 is a perspective view of one of the adjustable supporting brackets for the shelves.
Fig. 12 is a perspective view of the cornice showing the method of connection between the cornice and the structural members of the frame.
Figures 18, 19, 20, 21, 32:
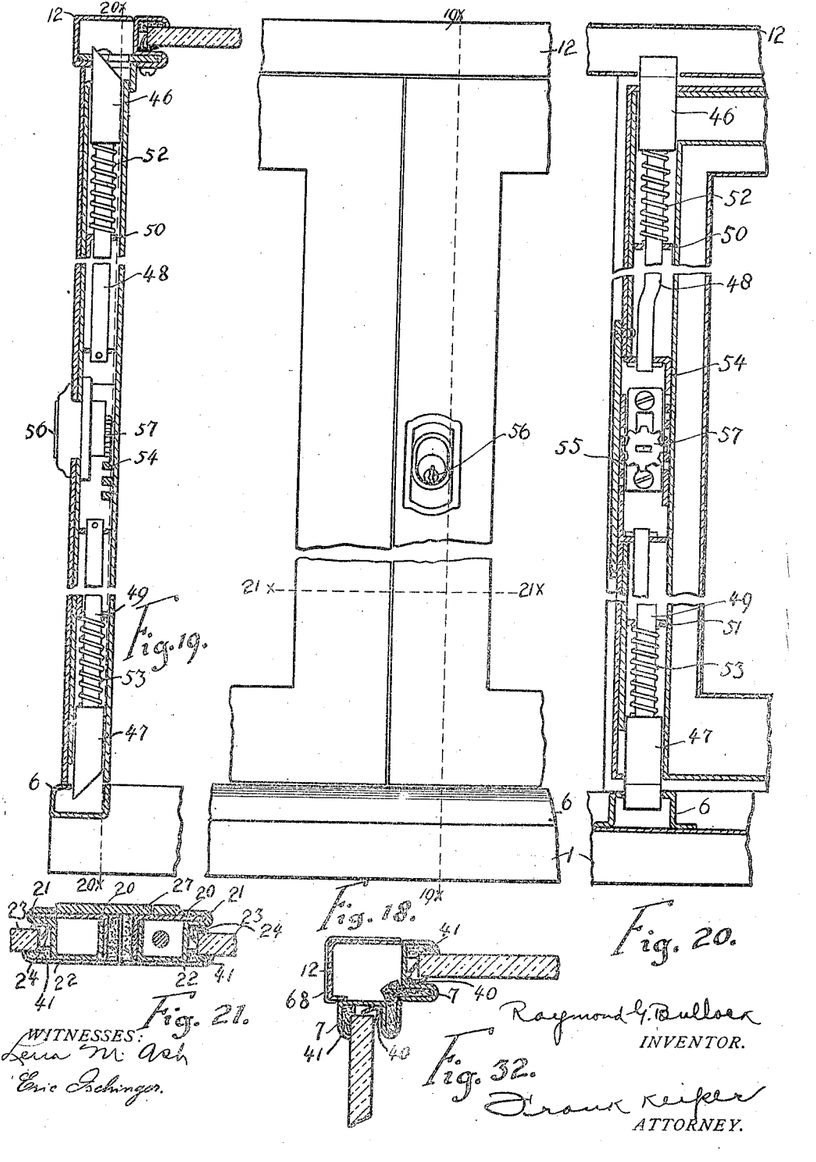
Fig. 18 is a front elevation, partly broken away, of the free ends or lock stiles of the doors.
Fig. 19 is a vertical section through the locking mechanism, taken on the line $19^x$—$19^x$ of Fig. 18.
Fig. 20 is a vertical section through the locking mechanism, taken on the line $20^x$—$20^x$ of Fig. 19.
Fig. 21 is a horizontal section through the free ends of the doors, taken on the line $21^x$—$21^x$ of Fig. 18.
Fig. 32 is a section on the line $32^x$—$32^x$ of Fig. 30.
Figures 22, 28, 29, 30, 31:
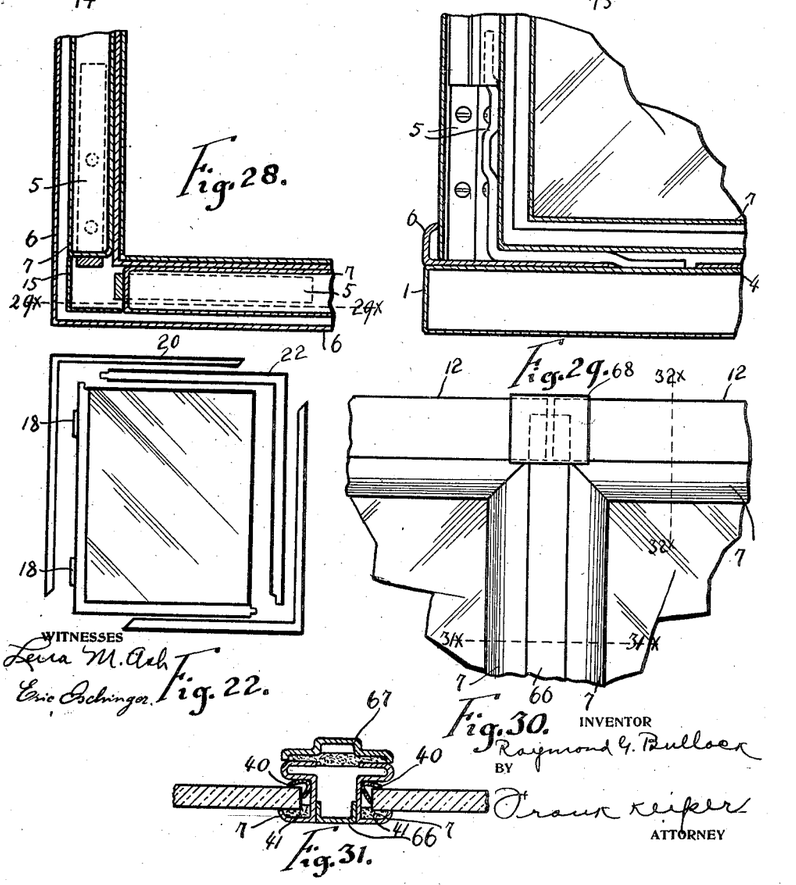
Fig. 22 is a detail of the separate members of the metal framework inclosing the glass panels of one of the doors.
Fig. 28 is a horizontal section taken on the line $28^x$—$28^x$ of Fig. 4.
Fig. 29 is a vertical section taken on the line $29^x$—$29^x$ of Fig. 28.
Fig. 30 is a side elevation of the metal case showing the assemblage of two panels on one side of the long case.
Fig. 31 is a cross section on the line $31^x$—$31^x$ of Fig. 30.

As illustrated in Fig. 6 I provide between the glass plate 2 and the molding 7 on one side the spring angle packing 40, which packing consists of a single plate of sheet metal bent to the form outlined in Figs. 31 and 32. One of these sheets of metal is placed in each molding in a position so that the inner edge of the glass plate will engage with the V shaped opening in said plate. The glass plate is then forced sidewise into spreading the spring angle packing 40 from the shape shown in Fig. 32 to the shape shown in Figs. 6, 7 and 15. The edge of the packing bearing against the edge of the glass plate will hold the plate securely against edgewise movement, and the edge of the packing that bears against the side of the glass plate will force the plate forward against the curved edge of the molding 7 and against the felt packing 41 that may be included between the outer upright side of the molding and the plate of glass. Each of these sections of moldings may be forced to position with relation to the glass plate 2 as above described and then connected to the adjacent moldings by means of the clips 5 and the screws 9 coöperating therewith, and when the last piece of molding is forced to position and connected to the others, the frame is complete and the glass is securely held therein.

*The glass top.*—The glass top of the case 3 consists of a single pane of glass substantially of the same size or slightly smaller than the top plate 4 of the base. The same molding 7 is used for encircling it as is used in connection with the glass panels of the sides. The top glass panel and the molding inclosing it is shown in section in Fig. 5.

Spot welded to each section of the molding is one of the clips 5 by which the four sections of the molding are joined together to form the casing with the glass plate therein. The glass plate is held securely both by the spring angle packing 40 and the felt packing 41 heretofore mentioned, the same as the glass plates are held by the corresponding parts in any of the upright panels.

*Connections between the panels.*—After the various parts of each of the panels have been put together the panels are then ready for assembling on the base. By way of assembling them each of the panels is placed with its lower edge in the molding 6 on the base in the manner shown in vertical section in Fig. 7, the upright inner wall of the channel 6 and the base entering into and engaging with the U shaped channel on the molding 7, the base of the channel 7 entering into the channel 6, between the front and back walls of which it is securely held against lateral movement. As there are four of the vertical glass panels 2, each of them will stand at right angles to each other, the corner of the one contacting with the corner of the other, as is illustrated in cross section in Fig. 6 and in perspective in Fig. 2. Under the adjacent offset ends of the clips 5 on adjacent panels is placed the dog 10 by which the adjacent panels are held securely together. The dog is made of sufficient thickness so as to be a tight fit under the upset ends of the clips, one of these dogs being used at the top and another dog being used at the bottom of each of the upright joints between the panels, the dog 10 being shown in position between the clips at the upper end of the joint in Fig. 2. Two of these clips will thus be used in each of the vertical corners of the case, making eight in all. If the case is sufficiently high and the panels are correspondingly long to make it necessary, the panels may be connected together at points intermediate their ends by welding to the upright molding clips which are substantially the same as either half of the clip 5, between which clips can be placed one of the dogs 10, thus holding the panels together securely at one or more intermediate points. The molding which surrounds the top panel are likewise provided with the clips 5, so that between the offset ends of such clips and the offset ends of the corresponding clips on the vertical panels, other dogs 10 may be used for the purpose of fastening such parts together and holding them in place.

In Fig. 2 I have referred to two of the members of the upright frame by the reference characters 7ª and 7ᵇ, and two of the members of another frame by the characters 8ª and 8ᵇ, and two of the members of the top frame by the characters 9ª and 9ᵇ, and the dogs 10, 10ᵇ and 10ᶜ are used for connecting these various members together through their clips in the manner above described.

Each of the upright panels sets in the channel 6 on the base and is held therein by gravity and whatever frictional engagement may be provided between the frame and the channel 6. For ordinary purposes this engagement is found to be sufficient. The U shaped channel on each of the moldings of the glass panels may be provided with a piece of felt packing which will project beyond the edge thereof, so that when the panels are placed together in the position shown in Figs. 2 and 6 the free ends of these packing strips will press against each other and form a joint which will be substantially dust proof. I prefer to use a separate strip in each of the U shaped channels, although it is obvious that a single strip may be used for two adjacent U shaped channels, but it is considered more desirable to insert a separate strip in each of the U shaped channels before the case is assembled rather than insert one felt strip in each of the two channels after the case has been assembled. A similar packing may be used between the top panel and the tops of the side panels.

*Moldings and cornices at joints.*—To conceal the joints and to decorate the case and give it a pleasing appearance when finished, I prefer to use moldings to cover the joints left at the vertical angles of the case between adjacent panels, and a cornice to cover the opening between the side panels and the top panel. For this purpose I employ the molding 15 shown in cross section in Fig. 6, which molding consists of a single piece of sheet metal bent to the form of an angle, shown in cross section in said figure, which angle extends down into and engages with the channel 6 and extends up and engages with the molding that forms the cornice 12. In this way the molding is securely locked in place at each end and can only be removed from the case by removing the molding or cornice at the top of the case. The edges of this molding may be turned in if so desired, but in such case such inturned edges would necessarily be cut away so as to avoid contacting with the clips 5 at the top and bottom of the case.

At the top of the case I provide the cornice molding 12 bent to the section shown in Fig. 5, which molding is of the shape of the channel, having the top side wide and the bottom side narrow. This molding has its corners cut to a bevel for the purpose of forming miter joints at the corner. Each piece of this molding is left separate from the other pieces, so that four separate pieces of the molding are used for the purpose of surrounding the top of the case. Each of these moldings is provided near each end with an angle lug 13 illustrated in Fig. 12, the depending end of which is adapted to engage with the recess 11 provided in the clips 5 that bind up the corners of the frame of the top of the case.

The molding is put in position by placing it above the joints between the top and side of the case, engaging the depending ends of the lugs 13 with the recesses 11 and then pressing it down into position. Similar recesses are shown in the clips that join the various parts of the side panels of the case together, although such recesses may be dispensed with in the side panels if so desired. There is however no objection to their presence in the clips used on the side panels and as their presence is permissible a single die is sufficient to form all of the clips used on all parts of the case.

Figure 26:
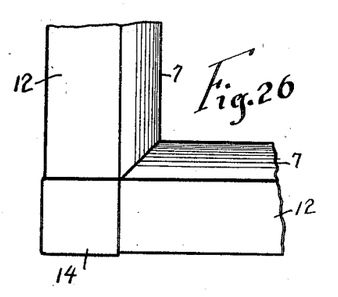
Fig. 26 is a detail view of one of the top corners of the completed case.
Figure 27:
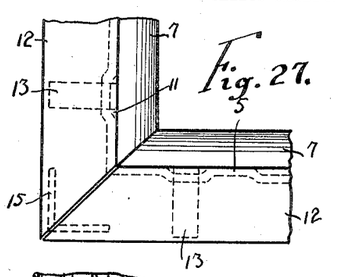
Fig. 27 is a detail view of the top corner of the completed case shown in Fig. 26, with the corner clip removed.

To cover the joint at the corners of the case between adjacent pieces of the cornice 12 I provide a special corner molding 14, shown in plan view at the lower left hand corner of Fig. 26 and in sectional elevation in Fig. 5. This special corner molding consists of a single piece of sheet metal suitably cut away, with the sides bent down and in as indicated in cross section in Fig. 5, the joint between said sides being closed by any suitable welding process. Between the top and bottom of this special corner piece 14 there is sufficient spring to enable it to securely engage with and hold to the cornice moldings 12 with which it engages. In this way the joint between consecutive pieces of the cornice molding are completely concealed.

*Doors.*—It is desirable in some instances to provide the case with glass doors, and for such construction I provide my improved show case with glass doors with suitable locks therefor, which doors are shown in detail in Figs. 13 to 22 inclusive. For this purpose I provide preferably double doors occupying the whole of one side of the case, one of said doors being hinged at one side of the case and the other of said doors being hinged at the other side of said case, the doors meeting and locking at the center of that particular side of the case. To support the doors I provide adjacent thereto at the corner an upright channel 16, shown in section for instance in Fig. 15, inside of which I place a reinforcing strip 17. To this reinforcing strip is attached the hinge 18 by suitable screws 19.

Figures 13, 14, 15, 16, 17, 23, 24, 25:
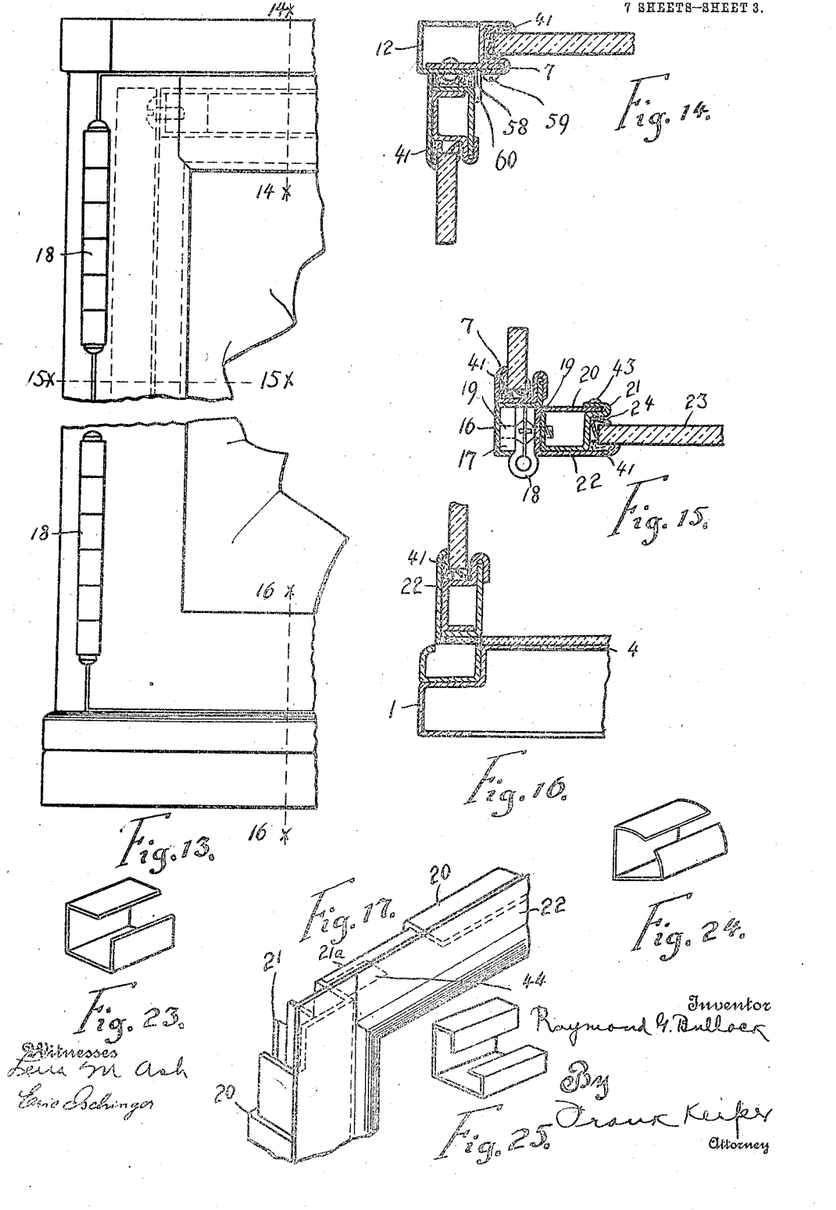
Fig. 13 is a front elevation of the door and casing, showing the hinges between them, the casing being partly broken away.
Fig. 14 is a vertical section on the line $14^x$—$14^x$ of Fig. 13.
Fig. 15 is a horizontal section on the line $15^x$—$15^x$ of Fig. 13.
Fig. 16 is a vertical section on the line $16^x$—$16^x$ of Fig. 13.
Fig. 17 is a detail perspective view showing the connections between the separate members making up the frame that incloses one of the glass panels of the door.
Figs. 23, 24 and 25 are detail perspective views of the dogs used for holding adjacent sections together.

The hinge stile of the door is composed of the upright channel 21 and the angles 20 and 22. Between the channel 21 and the angle 22, as illustrated in Fig. 15, is contained the glass panel 23 of the door, a spring angle packing 24 being interposed between the glass and the upright channels forming the stile. Felt packing is provided interposed between the glass panel 23 and the angle 22 of each of the doors. The hinge 18 is attached to the door by passing the screws 19 through the angle 20 and channel 21.

The part of the door illustrated in cross section in Fig. 15 is the hinge stile of the left hand door. The hinge stile of the right hand door is the same as that illustrated for the left hand door except that the position of the parts thereof is symmetrically reversed horizontally from right to left.

Of the parts of the door illustrated in Fig. 15, the channel 21 is welded to the angle 22 and one leg of the angle 20 is fastened to the channel 21 at one side by the screws 43 and at the other side by the hinge screws 19. To the more securely connect the channel 16 to the adjacent glass panel I provide the channel 16 on one side with an upturned edge which extends into the narrow channel which is formed on the inner part of the molding 7, filling in the recess left in said channel with any suitable packing material. In this way the channel 16 is placed at the corner of the case, completely filling the corner of the molding 6 and making the use of a corner molding 15 at that corner unnecessary.

As heretofore stated, the angle 22 and channel 21 are welded together. At the lower end these parts are beveled to form a miter joint with the corresponding pieces that form the lower part of the door frame. At this joint these parts are welded together as illustrated at the lower left hand corner of the inner frame of the door, shown in Fig. 22. The corresponding pieces forming the upper rail of the door and the locking stile of the door are also welded together at the upper right hand corner, leaving open joints at the upper left hand corner and the lower right hand corner. The angle 20 has its corners beveled and welded together at the upper left hand corner of the door and the lower right hand corner of the door, the open joint between being closed by fastening the parts together by screws. For this purpose the channel 21ª carries therein the small angle iron 44 which is perforated and suitably threaded, and with which engages a screw 45 which passes through the channel 21. In like manner the same parts are connected together at the corner diagonally opposite thereto.

To assemble the door the glass panel is set in the opening between the channel 21 and the angle 22 of the part forming the side and bottom of the door. The part forming the top and other side of the door is then placed in position over the glass panel and forced to position, the corners being connected by screws in the manner aforesaid. The angles 20 are then placed in position, being connected to the channel 21 by the hinge screws 19 aforementioned, and at suitable intervals by the screws 43. This completes the door and gives an exceptionally strong construction, more especially by reason of the fact that at each corner of the door occurs a welded joint bridging over the joint between the other portions of the door that at that place are closed by screws or other movable fastenings.

The lock stile of each of the doors is shown in cross section in Fig. 21. The lock stile of the left hand door as shown in Fig. 21 is made up of the channel 21 and angle 22, between which is contained the glass panel 23, the spring angle packing 24 being interposed between the channels composing the stile and the glass panel, all as heretofore described. On the left hand door as shown in Fig. 21, is carried an overlapping strip 27 which overlaps and closes the joint that is made between the abutting stiles of the left and right hand doors, it being understood that the left hand door is closed first and the right hand door is closed last. The lock stile of the right hand door shown in Fig. 21 is also made up of the channel 21 and angle 22 inclosing between them at the right the glass panel 23 and within them the locking mechanism which I will now describe.

*Locking mechanism.*—The right hand door illustrated in Fig. 18 is provided with locking mechanism as follows: Within the lock stile shown in cross section on the right of Fig. 21 are provided the sliding bolts 46 at the top and 47 at the bottom. Each of these bolts engages with a suitable recess, the bolt 46 engaging with the recess in the top cornice 12, and the bottom bolt 47 engaging with a suitable recess in the molding 6. Connecting these bolts 46 with the members of the lock are the rods 48 and 49. These rods are preferably round in cross section and at suitable places pass through perforations in stops 50 and 51. Between these stops and the large heads of the bolts are compression springs 52 and 53 which normally throw the bolts outward, causing them to engage with the top and bottom members of the case. These rods 48 and 49 are in turn connected to sliding racks 54 and 55.

Figures 33, 34, 35, 36, 37:
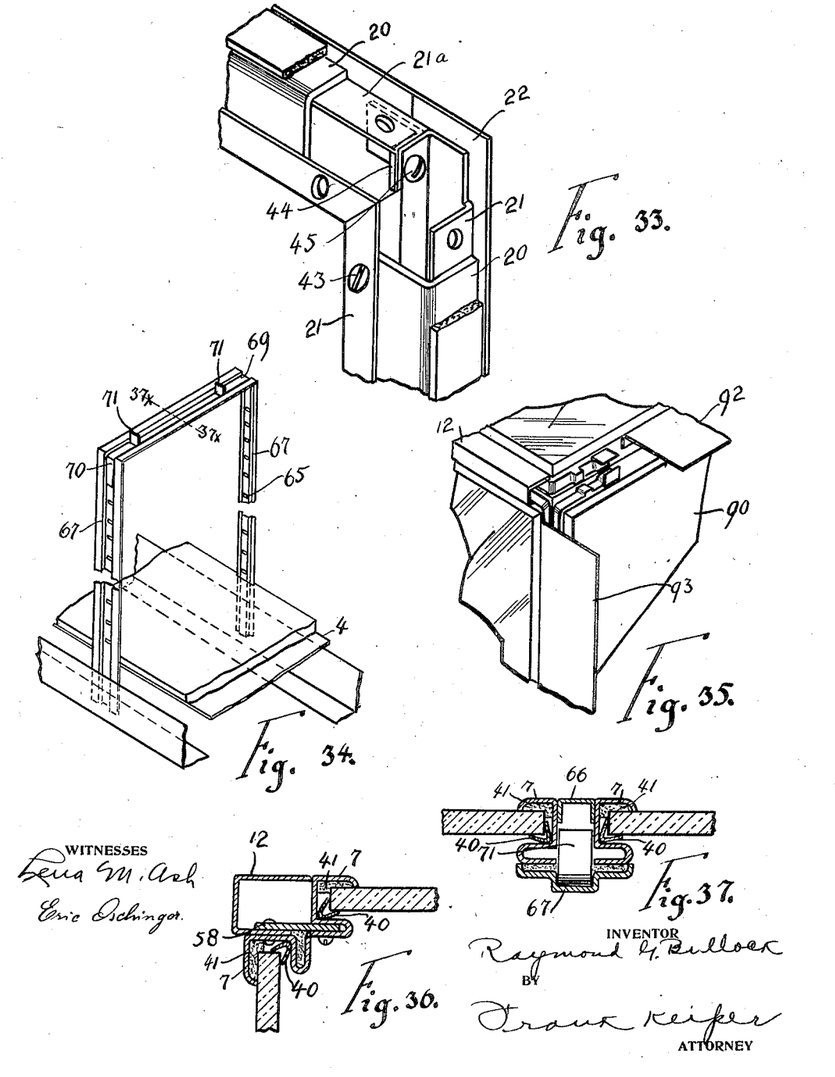
Fig. 33 is a perspective detail view of the parts shown in Fig. 17, looking at them from the opposite side.
Fig. 34 is a perspective view of the supporting strip used in the middle of an extra long case.
Fig. 35 is a perspective view of the back of the case as it can be arranged to set against the wall.
Fig. 36 is a vertical cross section through the top and a side of the case, showing a special fastening between them.
Fig. 37 is a cross section on the line 37ˣ—37ˣ of Fig. 34.

Mounted in a suitable bearing in the lock stile is a cylinder lock 56. On the rear end of the cylinder of this lock is mounted the pinion 57 which engages with the racks 54 and 55, so that by turning a suitable key in said cylinder lock the pinion is rotated and the racks are moved to draw the bolts 46 and 47 inwardly, thus drawing them from engagement with the upper and lower members of the casing and releasing the door for outward movement.

Where doors and locking mechanism therefor are used on the show case the cornice and panels at the top should be securely fastened in position, so that access to the case cannot be had by simply removing the top of the case. As the doors give access to the interior of the case, it is possible to fasten the top panel in place from within the case and prevent the removal therefrom by access from without the case. For this purpose I provide a positive connection between the cornice 12 and the molding 7 of the top panel. This connection consists of a plate 58 which is riveted to the cornice 12, as shown in Fig. 14, and projects into the recess on the bottom of the molding 7. This plate 58 is fastened in the molding 7 by means of screws 59. A lip 60 may be struck up from the plate 58, forming a suitable stop for the top of the door. The other sides of the top panel of the case are fastened from removal and the case is made safe against being tampered with from without at the top as follows: A metal plate 58 similar to that shown in Fig. 14 is riveted to the molding at the top of the upright panel shown in Fig. 5, which plate engages with the channel on the molding 7 of the top panel of the frame. These parts are illustrated in detail in Fig. 36. In this way the top panel is made fast to the upright panels all around.

The case is made secure against being tampered with at the bottom as follows: The top plate 4 of the base is perforated at suitable intervals, as is the channel 6, and the molding 7 adjacent thereto is perforated and threaded. Screws may be inserted through the top plate 4 of the base, engaging with the threaded openings in the molding 7 by which the panels may be securely held to the bottom of the case.

Inside of the case I provide upright standards or supporting strips 61 at the corners for the shelves, shown in cross section in Fig. 10. These supporting strips have a reduced end with shoulders on either side thereof by which they are tenoned into the bottom plate. On these supporting strips are adjustably fastened the brackets 62, each of which brackets has a tongue 63 at the top and feet 64 at the bottom, the tongue 63 engaging with openings 65 in the supporting strip, and the feet bearing against the sides of the supporting strip 61. The supporting strip 61 is channeled and the feet 64 bear against the strip on either side of said channel, preventing said support from swinging thereon. I preferably make these feet fit snugly against either side of the channel so that it requires a slight pressure to force them into place. Between these supports 61 is placed the shelf 80, which shelf completely fills the opening in the casing and holds the supporting strips 61 in place, so that it is not necessary to fasten them in any way at the top.

In extra large cases it may be desirable to make the panels on two or more of the sides thereof in two or more pieces, and in such case I provide a joint between said panels such as is illustrated in cross section in Fig. 31. In this instance between the moldings 7 I insert a channel 66, which channel completely fills the opening between them. When this channel is removed a certain lateral movement of the panels is permitted which facilitates their easy removal or insertion. This channel 66 covers the interval between the panels at the front. The channel 66 engages at the bottom in the molding 6 and it may have a reduced end with shoulders on either side thereof passing through said molding into the base, being thereby tenoned into the base. At the top it would be held in place by the cornice 12, and in such case I may also divide the cornice 12 and cover the interval between them with a special clip 68 similar to the corner molding 14 used at the corners. Within the casing at such joints I may provide an upright standard or supporting strip 67 which is substantially like the supporting strip 61, and is formed for the purpose of carrying the supports 62 thereon, giving a support for the shelves intermediate of the corners of the case. This supporting strip 67 extends to the top of the case and preferably across the casing under the top panel and down on the opposite side of the casing. It is deemed better to have all of these pieces in one, both on account of the simplicity of construction and the support given to the top panel or the top panels in case two panels are used instead of one, for in such case the joint between the panels would occur immediately over this supporting strip.

The supporting strip is fastened in place at the bottom of the case in the following manner: The top of the base 4 is perforated with suitable openings permitting the supporting strip 67 to extend therethrough and into the flange on the bottom of the show case, which may be extended and provided with a suitable recess on each side of the case for such purpose, in which recess the end of the supporting strip is securely fastened on each side. In this way the supporting strip is held rigidly in an upright position. Ordinarily I prefer to make this supporting strip all of one piece, bent at the corners. Where necessary however this strip may be made with three pieces, the top piece being separate from and connecting the two upright pieces at the sides. In such case the top and side pieces are connected together by the reinforcing strips 69 and 70 on which I provide the upturned lugs 71 which extend up between the moldings of the adjacent top panel sections, holding said supporting strip against angular movement at the top. The supporting of the top panels and the engagement between the top panels and the supporting strip are shown in cross section in Fig. 37.

Figures 38, 39, 41, 42:
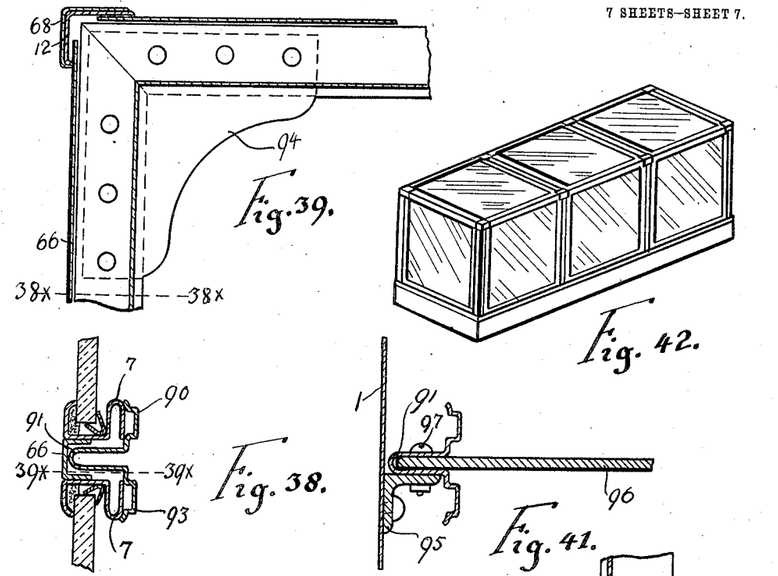
Fig. 38 is a cross section on the line 38ˣ—38ˣ of Fig. 39, showing an improved supporting strip, being a substitute for that shown in Fig. 37.
Fig. 39 is a side elevation of the improved supporting strip shown in cross section in Fig. 38.
Fig. 41 is a cross section of the fastening strip in the base, on the line 41ˣ—41ˣ of Fig. 40.
Fig. 42 is a perspective view of the case, having three panels on two of the opposite sides thereof, and on the top.

In Fig. 38 I have shown in cross section a modified form of a supporting strip 90 to be used between two adjacent panels that must be used on the sides of the case in long cases. This supporting strip 90 is formed of a single sheet of metal bent to the form of a deep narrow channel 91, the edges of which are bent out at right angles thereto and formed into the moldings 92 and 93. The channel 91 is deep enough to normally form a brace for the channel 66 and the moldings 92 and 93 overlap the moldings 7, 7 that make up the frame of the adjacent panels.

The supporting strip 90 will extend continuously up one side of the case, across the top and down on the opposite side, being substantially a U shape inverted. It will be formed of three pieces of molding mitered at the meeting ends at the upper corners where the parts may if desired be welded together.

Figure 40:
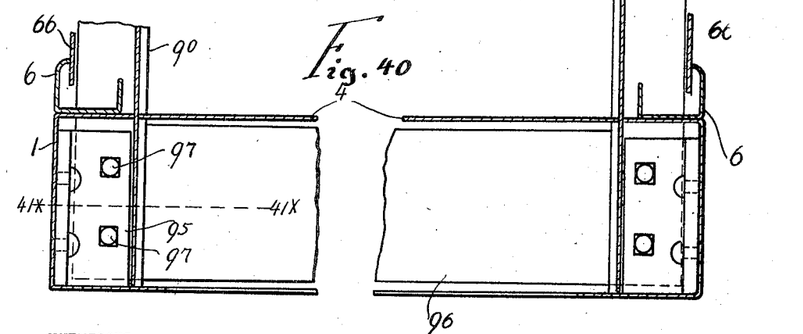
Fig. 40 is a cross section of the base, showing an improved fastening for the supporting strip.

A gusset 94 cut from sheet metal may be fastened in the channels 91 at the corners to reinforce and stiffen the structure, and if such a gusset is used the pieces of the molding need not be welded together at the miter corners. This permits the supporting strip to be manufactured and shipped in three pieces, which may be fastened together at the corners by the gussets when the case is set up. The supporting strip is fastened in the base in the manner shown in Figs. 40 and 41. The supporting strip 90 will extend through the base plate 4 down into the base, and rest on the bottom flange of the base. To the side of the base may be riveted the angle 95, to which in turn may be bolted the supporting strip 90. A connecting plate 96 may be inserted in the channel 91 in the base and fastened thereto by the bolts 97, 97, which connecting plate will extend across and connect to the supporting strip on the other side of the base, where the supporting strip will be held in place in like manner. In this way the supporting strip will be securely held in place on the base.

It is apparent that the channel 91 extending between the adjacent panels on both sides of it and at the top, will be braced thereby and will be securely held in place, in turn holding the top panels in place and contributing to the support of the shelves that may be contained in the case, it being understood of course that the moldings 92 and 93 are perforated for the purpose of supporting brackets 62, in the same way as the supporting strip 65 is perforated, illustrated in Fig. 9.

The case as heretofore described is intended to set in the middle of the floor and is constructed accordingly, the contents of the case being open to inspection from all sides. Sometimes however the case must be placed against the wall, and in such instances on the side of the case that is placed against the wall, instead of the glass panel I prefer to use a metal plate 90 covered with cork or any other equivalent substance. I also prefer to use filler plates 92 and 93 between the top and sides of the case and the wall, these filler pieces being each a single sheet of metal provided at the angles at suitable intervals with a lug 13 such as are used on the cornice members 12 illustrated in Fig. 12. The four plates may be of any width, such as the surroundings may necessitate.

The case which I have illustrated in the drawings has substantially the form of a cube, although it is obvious that show cases may be built containing my invention in which the length, breadth and height thereof are not equal. It is also obvious that the show case may be built having more or less than four vertical sides, all such changes coming easily within the scope and spirit of my invention and being understood to be within the meaning of such terms as cube, prism, or other equivalent descriptive terms that I may use for convenience merely in describing my invention in the claims.

Having thus described my invention, what I claim as new and patentable is as follows:

1. The combination in a show case of a glass panel, a metallic frame therefor surrounding said panel, said metallic frame comprising a plurality of separate pieces, clips for holding said pieces together, said panel and its frame being complete in itself, a dog for engaging with said clips on each two adjacent panels to hold said panels together in position.

2. The combination in a show case of panels therefor, moldings surrounding said panels, said moldings being shaped in cross section with a base, a U-shaped channel inverted on one edge thereof, a side wall erected on the other edge thereof, said side wall having its upper edge bent in toward said inverted channel, the opening in said inverted channel being smaller than the opening between said inverted channel and said side wall, a glass plate engaging with said last named opening, a spring V-shaped plate interposed between the edge of said glass and said inverted channel.

3. The combination in a show case of a panel comprising a glass, a molding engaging the edge of said glass, one edge of said molding being turned up and in toward the glass, a spring metal packing strip between the other edge of said molding and the edge of said glass, said packing strip forcing said glass over against the inturned edge of said molding, said packing strip being V-shaped in cross section and engaging with both sides of the edge of the glass.

4. The combination in a show case of a panel comprising a glass, a molding engaging the edge of said glass, one edge of said molding being turned up and in toward the glass, a spring metal packing strip between the other edge of said molding and the edge of said glass, said packing strip forcing said glass over against the inturned edge of said molding, said packing strip being V-shaped in cross section and engaging with both sides of the edge of the glass, said sheet of glass tending to spread said V-shaped packing strip as it is forced thereinto.

5. The combination in a show case of a panel comprising a glass, a molding having two upturned edges engaging the edge of said glass, packing between one edge of the molding and said glass, a spring metal packing strip between the other edge of said molding and the edge of said glass, said packing strip bearing on the end and the side of the glass and being adapted as the glass is forced thereinto to force the glass laterally against the packing strip.

6. The combination in a show case of a base, a channel thereon extending around the edge thereof, panels seated in said channel, each of said panels having a U-shaped groove around the periphery thereof engaging with the inner wall of said channel, packing material filling the balance of said groove around the panel and projecting therefrom, said panels being positioned to bring into contact with each other the packing material of the adjacent edges of the panels.

7. The combination in a show case of a base, of a channel fastened on the top of said base, panels positioned in said channel, the inner edges of said panels being in abutment, leaving the end surfaces of the panels exposed, each of said panels including a glass plate and a frame of metallic molding surrounding it, clips fastened over the corners of said channels extending over the adjacent end surfaces of the panel, dogs connecting between clips of adjacent panels.

8. The combination in a show case of a base, of a channel fastened on the top of said base, panels positioned in said channel, the inner edges of said panels being in abutment, clips fastened on the ends of said channels, dogs connecting between clips of adjacent panels, said dogs being moved endwise into and out of engagement with said clips and being held thereon by frictional engagement.

9. The combination in a show case of a base, of a channel fastened on the top of said base, panels positioned in said channel, the inner edges of said panels being in abutment, clips fastened on the ends of said channels, dogs connecting between clips of adjacent panels, said dogs being moved endwise into and out of engagement with said clips and being held thereon by frictional engagement, moldings spanning the opening between the outer edges of said panels and concealing said clips and dogs.

10. The combination in a show case of a base, of a channel fastened on the top of said base, panels positioned in said channel filling said channel except at the corners of the base, means for fastening said panels together along the meeting edges, moldings engaging with said channel at the corner and filling the openings between the ends of the panels, said moldings concealing said fastening means.

11. The combination in a show case of a base, a channel fastened on said base, panels positioned in said channel and filling said channel except at the corners thereof, means for fastening said panels together along the meeting edges, moldings engaging with said channel at the corners, filling the interval between said panels, means for holding said molding in position at the top, said channel holding said moldings in position at the bottom, said moldings concealing said fastening means, said means and said clips being exposed in the recesses in the corners of the case, a molding for concealing the means and clips, said molding lying flush with the panel.

12. The combination in a show case of panels forming the sides thereof, clips mounted on the edges of said panels having offset ends, dogs engaging one of said clips on two of said panels, holding said panels together.

13. The combination in a show case of panels, each of said panels comprising a plate of glass, and a molding surrounding said glass, packing material carried by said molding, the packing material of consecutive panels being contiguous, dogs and clips for locking consecutive panels in fixed relation with each other.

14. The combination in a show case of side panels and a top panel arranged in cubical form, means for connecting said side panels and said top panel into fixed relation with each other, said means comprising offset clips on the edges of each of said panels, dogs sliding into engagement with said clips on two of said panels, thereby connecting said panels together.

15. The combination in a show case of a rectangular glass top panel, a metallic frame surrounding said panel, said frame being made up of a molding strip on each side thereof, clips at the corners for holding said molding strips together, sockets formed in said clips on the outside of the frame, a cornice on each side of said panel, lugs on said cornice capable of engaging with said sockets on said top panel.

16. The combination in a show case of a rectangular glass top panel, a metallic frame surrounding said panel, said frame being made up of a molding strip on each side thereof, clips at the corners for holding said molding strips together, sockets formed in said clips on the outside of the frame, a cornice on each side of said panel, lugs on said cornice capable of engaging with said sockets on said top panel, the ends of said cornices being beveled to form miter joints with adjacent cornices.

17. The combination in a show case of upright panels and a top panel, means for connecting said panels together, upright moldings for concealing the joints between consecutive ones of the upright panels, a cornice mounted on and surrounding the top panel, said moldings engaging with said cornice and being held in position thereby.

18. The combination in a show case of side panels and a top panel, means for holding said panels in fixed relation with each other, sockets on said top panel, a cornice having lugs thereon engaging with said sockets, a special corner molding enveloping said cornices at the corners.

19. The combination in a show case of a top panel comprising a pane of glass, a sheet metal frame therefor, said frame having a channel opening inward toward said glass, and another channel opening outward and away from said glass, upright panels, means for connecting said upright panels with said top panel, said means comprising a plate rigidly connected to the edge of each said top panels and projecting inward, said plate engaging with the outwardly facing channel on the top panel.

20. The combination in a show case of a top panel comprising a pane of glass, a sheet metal frame therefrom said frame having a channel opening inward toward said glass, and another channel opening outward and away from said glass, upright panels, means for connecting said upright panels with said top panel, said means comprising a plate rigidly connected to the edge of each of said top panels and projecting inward, said plate engaging with the outwardly facing channel on the top panel, means for positively fastening said plate to the frame of the top panel.

21. The combination in a show case of side and rear panels therefor, a top panel therefrom means for connecting said panels together, door casings attached to two of said side panels, doors hinged to said casings and filling the opening between said side panels, each of said door casings consisting of a channel having an outwardly turned flange thereon, a channel on each of said side panels with which the flanges on said door casings engage.

22. The combination in a show case of a door comprising a glass plate, a frame surrounding said plate, said frame being made up on each side of a plate bent into the form of two channels, said channels being disposed at right angles to each other and opening toward each other, the plate connecting them forming an angle iron at that point, an angle iron engaging with one of said channels and extending across and alongside of the other of said channels, and another angle iron fastened to the base of said channel and extending outwardly therefrom, the glass plate being retained between said angle iron and the angle iron connecting said channels.

23. The combination in a show case of a door comprising a glass panel and a metallic frame therefor, said frame comprising a channel and two angles, said channel and one of said angles being welded to each other, said channel and said angles each extending continuously in one piece around two sides of the door and in another piece around the other two sides of the door, connections for fastening said pieces together.

24. The combination in a show case of a door comprising a glass panel and a metallic frame therefor, said frame comprising a channel and two angles, said channel and one of said angles being welded to each other, said channel and said angles each extending continuously in one piece around two sides of the door and in another piece around the other two sides of the door, connections for fastening said pieces together, the joints between such pieces occurring at opposite joints so as to break joints with each other.

25. The combination in a show case of a base, two consecutive panels on each of two of the opposite sides thereof, a filler between said panels filling the interval between them, a U-shaped supporting strip mounted in the base and closing the opening between said panels within the case.

26. The combination in a show case of a base, two consecutive panels on each of two of the opposite sides thereof, a filler between said panels filling the interval between them, a U-shaped supporting strip mounted in the base and closing the opening between said panels within the case, two top panels in said case, said supporting strip extending under the joint between said top panels and bearing equally on and supporting both of them.

27. The combination in a show case of a base, two consecutive panels on each of the two opposite sides thereof, a filler between said panels filling the interval between them, a U-shaped supporting strip mounted in the base and closing the opening between said panels within the case and projecting outwardly between said panels and forming a support for said filler.

28. The combination in a show case of a base, two consecutive panels on each of the two opposite sides thereof, a filler between said panels filling the interval between them, a U-shaped supporting strip mounted in the base and closing the opening between said panels within the case and projecting outwardly between said panels and forming a support for said filler, a base, said supporting strip extending into said base, an angle fastened on the side of said base, connections between said angle and said supporting strip, holding said supporting strip in place.

29. The combination in a case of a base, perforations on opposite sides of said base, angles mounted in said base adjacent to said perforations, supporting strips extending upwardly from said base, fastened to said angles, a connecting plate extending between and fastened to said supporting strips.

30. The combination in a show case of a supporting strip therefor, said supporting strip being formed in cross section with a deep narrow channel extending in one direction and a molding on either side of said channel formed integral therewith extending outwardly therefrom and in the other direction.

31. The combination in a show case of a base, side panels mounted thereon, a pair of side panels mounted on two opposite sides of said case, an outer channel filling the space between said panels mounted flush with the outside of said panels, a reinforced adjustment strip spanning the framework of said panels on the inside of said case and having a channel formed therein projecting outwardly between said panels.

32. The combination in a show case of a base, side panels mounted thereon, a pair of side panels mounted on two opposite sides of said case, an outer channel filling the space between said panels mounted flush with the outside of said panels, a reinforced adjustment strip spanning the framework of said panels on the inside of said case and having a channel formed therein projecting outwardly between said panels, said channel bearing against and bracing said outer channel.

33. The combination in a show case of panels having on each side both inner and outer edges, said panels being placed in the case so that their inner edges only make contact with each other leaving an angular recess between them, clips on the said sides of the panels between the edges in said recesses means for engaging with adjacent clips for holding the clips and panels together.

In testimony whereof I affix my signature in presence of two witnesses.

RAYMOND G. BULLOCK.

Witnesses:
B. G. PARTRIDGE,
FLORENCE H. SCHENCK.